(12) United States Patent
Herrmann et al.

(10) Patent No.: US 11,719,364 B2
(45) Date of Patent: Aug. 8, 2023

(54) BARRIER LAYER FOR HOSES

(71) Applicant: ContiTech Schlauch GmbH, Hannover (DE)

(72) Inventors: Wolfram Herrmann, Wunstorf (DE); Dieter Borvitz, Hannover (DE); Steffen Wietzke, Uetze (DE); Frank Jungrichter, Korbach (DE); Hartmut Bangert, Diemselsee (DE)

(73) Assignee: ContiTech Schlauch GmbH, Hannover (DE)

( * ) Notice: Subject to any disclaimer, the term of this patent is extended or adjusted under 35 U.S.C. 154(b) by 0 days.

(21) Appl. No.: 16/956,324

(22) PCT Filed: Oct. 15, 2018

(86) PCT No.: PCT/EP2018/078013
§ 371 (c)(1),
(2) Date: Jun. 19, 2020

(87) PCT Pub. No.: WO2019/120677
PCT Pub. Date: Jun. 27, 2019

(65) Prior Publication Data
US 2021/0080035 A1    Mar. 18, 2021

(30) Foreign Application Priority Data
Dec. 21, 2017  (DE) ..................... 10 2017 223 546.2

(51) Int. Cl.
*F16L 11/04* (2006.01)
*C08K 3/04* (2006.01)
(Continued)

(52) U.S. Cl.
CPC .............. *F16L 11/04* (2013.01); *B29C 48/02* (2019.02); *B29C 48/09* (2019.02); *B29C 48/151* (2019.02);
(Continued)

(58) Field of Classification Search
CPC .......... F16L 11/04; F16L 11/045; F16L 11/08; F16L 11/083; F16L 2011/047;
(Continued)

(56) References Cited

U.S. PATENT DOCUMENTS 5,356,681 A     10/1994  Ichikawa et al.
5,588,469 A  *  12/1996  Kakiuchi ................. F16L 11/04
                                                                138/125

(Continued)

FOREIGN PATENT DOCUMENTS

DE     4311549 A1     10/1993
EP     0404239 A2  *   5/1989
(Continued)

OTHER PUBLICATIONS

Chinese office action of applicaton 2018800826395 dated Dec. 9, 2021 (counterpart of this application).

*Primary Examiner* — Lee E Sanderson
(74) *Attorney, Agent, or Firm* — David L. Cate; Gregory Adams

(57) ABSTRACT

The invention relates to a hose having at least one barrier layer inner layer and an outer layer, wherein the barrier layer is obtainable by extrusion of a mixture comprising a) at least one thermoplastic fluoropolymer, b) at least one fluororubber and a crosslinking agent and/or at least one fluororubber elastomer and c) at least one carbon filler selected from carbon black, in particular conductivity carbon black, graphene, carbon nanofillers, in particular carbon nanotubes, carbon nanohorns, or a combination thereof in an amount of 0.05% by weight to 20% by weight of the carbon filler(s), or irradiated PTFE, and vulcanization. The hose exhibits a high fuel, diesel and oil stability and dynamic capability.

18 Claims, 6 Drawing Sheets

(51) Int. Cl.
*B32B 1/08* (2006.01)
*B32B 25/04* (2006.01)
*B32B 27/32* (2006.01)
*C08L 9/02* (2006.01)
*C08L 15/02* (2006.01)
*C08L 27/18* (2006.01)
*B29D 23/00* (2006.01)
*B29C 48/151* (2019.01)
*B29C 48/09* (2019.01)
*B29C 71/02* (2006.01)
*B29C 48/02* (2019.01)

(52) U.S. Cl.
CPC ............ *B29C 71/02* (2013.01); *B29D 23/001* (2013.01); *B32B 1/08* (2013.01); *B32B 25/042* (2013.01); *B32B 27/322* (2013.01); *C08K 3/041* (2017.05); *C08K 3/042* (2017.05); *C08K 3/044* (2017.05); *C08L 9/02* (2013.01); *C08L 15/02* (2013.01); *C08L 27/18* (2013.01); *C08K 2201/001* (2013.01); *C08L 2203/18* (2013.01); *C08L 2203/30* (2013.01); *C08L 2312/00* (2013.01); *F16L 2011/047* (2013.01)

(58) Field of Classification Search
CPC .......... C08L 2205/025; C08L 2205/03; C08L 27/12; C08L 27/14; C08L 27/16; C08L 27/18; C08L 27/20; B67D 7/04; B32B 1/08; Y10T 428/1393; C08J 27/12; C08J 27/14; C08J 27/16; C08J 27/18; C08J 27/02; B29B 7/00; B29B 9/06
USPC .................................. 428/36.9, 36.91, 36.92
See application file for complete search history.

(56) References Cited

U.S. PATENT DOCUMENTS

| | | | | |
|---|---|---|---|---|
| 6,203,873 | B1* | 3/2001 | Shifman | B32B 27/12 |
| | | | | 428/36.8 |
| 6,340,511 | B1 | 1/2002 | Kanbe et al. | |
| 2004/0187948 | A1* | 9/2004 | Shifman | F16L 11/081 |
| | | | | 138/125 |
| 2004/0191440 | A1* | 9/2004 | Funaki | B32B 27/34 |
| | | | | 428/34.6 |
| 2007/0100077 | A1* | 5/2007 | Lavanga | C08L 27/18 |
| | | | | 525/199 |
| 2008/0081139 | A1* | 4/2008 | Iwahara | B32B 1/08 |
| | | | | 428/36.6 |
| 2009/0011164 | A1* | 1/2009 | Masuda | C08L 53/00 |
| | | | | 428/36.92 |
| 2009/0203846 | A1* | 8/2009 | Park | C08L 27/12 |
| | | | | 525/200 |
| 2009/0274857 | A1* | 11/2009 | Garver | B32B 27/40 |
| | | | | 428/36.6 |
| 2011/0290363 | A1* | 12/2011 | Yanagiguchi | C08L 27/18 |
| | | | | 138/137 |
| 2015/0056393 | A1* | 2/2015 | Mizutani | F16L 11/04 |
| | | | | 428/36.9 |
| 2016/0305581 | A1* | 10/2016 | Fauble | B32B 1/08 |

FOREIGN PATENT DOCUMENTS

| | | |
|---|---|---|
| EP | 1096190 A1 | 5/2001 |
| EP | 1396670 A1 | 3/2004 |
| EP | 3228665 A1 | 10/2017 |

* cited by examiner

BARRIER LAYER FOR HOSES

The invention relates to hoses having a barrier layer and to a process for the production thereof.

In the case of hoses that are used for the transport of aggressive media, such as acids, fuels or oils, possibly also at elevated temperatures, high demands are placed on the stability of the hose materials used. To this end the hose is generally provided with an inner layer which has a barrier function with respect to the medium to be transported.

Due to its media stability and high temperature stability especially fluororubber mixtures are used for the inner layer having a barrier layer function with respect to the medium to be transported. These so-called FKM mixtures, also known as FPM mixtures, may be crosslinked with polyols and quaternary ammonium salts, such as is described for example in DE 43 11 549 A1 or in EP 1 096 190 B1, or may be crosslinked by bisphenolic and/or peroxidic means, such as is described for example in EP 1 396 670 B1.

Mixtures of fluorothermoplastic/crosslinked FPM are also employed as a low permeation material for inner layers of hoses. These mixtures are also known as FTPV (fluorothermoplastic vulcanizates).

If plastics are to have an electrical conductivity, electrically conductive fillers, such as conductivity carbon blacks, are often used. Conductivity carbon blacks are also known as conductive carbon blacks.

Hoses must generally also exhibit dynamic capability or elasticity. Dynamic capability and impermeability are interrelated material properties that are desired but represent a conflict of objectives. Addition of conductive carbon blacks intensifies this conflict. This can lead to cracks in the hoses which then fail. HF elimination can occur during processing, thus damaging the polymer.

The present invention has for its object to provide barrier layers for hoses that not only exhibit dynamic capability or elasticity but are also low-permeation. Hoses having electrical conductivity and high media stability, for example with respect to fuels or oils, should especially be obtained. The obtained hoses should exhibit good crack resistance and damage to the plastics during production should be avoided.

In a first embodiment this object was surprisingly achieved by a hose comprising at least one barrier layer inner layer and an outer layer, wherein the barrier layer is obtainable by extrusion of a mixture comprising
a) at least one thermoplastic fluoropolymer,
b) at least one fluororubber and a crosslinking agent and/or at least one fluororubber elastomer and
c) at least one carbon filler selected from carbon black, in particular conductivity carbon black, graphene, carbon nanofillers, in particular carbon nanotubes, carbon nanohorns, or a combination thereof,
wherein the mixture contains 0.05% to 20% by weight of the carbon filler(s), and vulcanization.

In a second embodiment this object was surprisingly achieved by a hose comprising at least one barrier layer inner layer and an outer layer, wherein the barrier layer is obtainable by extrusion of a mixture comprising
a) at least one thermoplastic fluoropolymer,
b) at least one fluororubber and a crosslinking agent and/or at least one fluororubber elastomer and
c) irradiated polytetrafluoroethylene (PTFE),
and vulcanization.

The hoses according to the invention of the first and second embodiments exhibit not only good dynamic capability and crack resistance but also a high stability to media such as fuels and oils.

In contrast to barrier layers that were produced analogously but contain no carbon filler it has been found in the first embodiment that, surprisingly, the addition of the carbon filler as defined brings about the loss of the thermoplastic properties in the barrier layer. This is apparent from the dynamic mechanical analysis (DMA) of the barrier layer. While DMA of a barrier layer produced without the addition of carbon filler results in the typical image for a thermoplastic vulcanizate (TPV), also referred to as a thermoplastic elastomer, melting of the thermoplastic cannot be observed in DMA of the barrier layer according to the invention produced with carbon filler: The storage modulus G' is not only significantly higher than that of the unfilled reference, but it must also be noted that the storage modulus and loss modulus G" change identically at temperatures above 230° C. This is shown even more clearly by tan delta=G"/G'. At 220° C. the unfilled material shows a tan delta >1 (G">G') while the filled material shows a tan delta of 0.7. According to the literature (for example Wikipedia: https://de.wikipedia.org/wiki/Viskoelastizit%C3%A4t) melting of the reference results in a liquid/melt while the filled material is a solid.

Transition Between Viscous and Solid Material Behavior (https://de.wikipedia.org/wiki/Viskoelastizit%C3%A4t):

All liquids and solids may be treated as viscoelastic materials when their storage modulus and loss modulus, G' and G", or their loss factor tan delta=G"/G' are reported. For ideal-viscosity liquids (Newtonian fluid) the storage modulus is very small compared to the loss module, and in ideal-elasticity solids obeying Hooke's law the loss modulus is very small compared to the storage modulus. Viscoelastic materials have both a measurable storage modulus and a measurable loss modulus. If the storage modulus is greater than the loss modulus the material at issue is a solid; otherwise it is a liquid.

|  | Liquids | | Sol-gel transition | Solids | |
| --- | --- | --- | --- | --- | --- |
| Material behavior | ideal viscosity | | viscoelastic | | ideal elasticity |
| storage modulus and loss modulus | G" >> G' | G" > G' | G" = G' | G" < G' | G" << G' |
| Loss factor | tan delta >> 1 | tan delta > 1 | tan delta = 1 | tan delta < 1 | tan delta << 1 |

Without wishing to be bound by a particular theory, it is assumed that the carbon filler in the thermoplastic brings about or promotes crosslinking. Accordingly, the barrier layer end product preferably contains no thermoplastic elastomer but rather, presumably, a crosslinked thermoplastic. The barrier layer produced according to the invention is especially no longer meltable.

In the second embodiment it was surprisingly found that the addition of irradiated PTFE powder forms an at least 3-phasic material. Additional advantages are a further-reduced permeation and a reduction in shear forces during processing. The latter results in reduced polymer degradation of the fluoropolymers, thus avoiding stress cracking corrosion.

It is particularly advantageous to employ electron beam-modified PTFE powder. These additives are described in Kautschuk Gummi Kunststoffe 5, 2005, 226. As an inert polymer, PTFE powder has no free radicals. Only irradiation forms long-lived radicals which are detectable by ESR (electron spin resonance). The PTFE preferably has less than $1\times10^{18}$ spins/g, particularly preferably $1\times10^{17}$-$1\times10^{14}$ spins/g. The size of the particles is preferably 500 µm to 0.01 µm, particularly preferably about 0.2 µm. The free radicals make it possible to couple the PTFE to the matrix.

Preferred embodiments of the process are specified in the dependent claims. The invention is elucidated in detail hereinbelow.

The vulcanization is preferably carried out at 150° C. to 200° C. It is particularly preferable when the vulcanization is carried out on the formed hose construction comprising at least the barrier layer inner layer and the outer layer.

The hose according to the invention comprises at least one barrier layer inner layer and an outer layer. The barrier layer is obtainable by extrusion of a mixture as defined hereinabove. The following applies to the first and the second embodiment unless otherwise stated.

The mixture used for the extrusion comprises at least one thermoplastic fluoropolymer. One, two or more thermoplastic fluoropolymers may be employed. Thermoplastic fluoropolymers are generally semicrystalline, meltable and thermoplastically processable fluoropolymers.

In the context of the present invention the thermoplastic fluoropolymer may be any thermoplastic fluoropolymer, with the exception of irradiated PTFE. In the first embodiment irradiated PTFE may be present in the mixture as an optional additional component. In the second embodiment irradiated PTFE is present in the mixture as an essential additional component.

Examples of suitable thermoplastic fluoropolymers are poly(chlorotrifluoroethylene-co-vinylidene fluoride) (CTFE/VDF), poly(ethylene-co-chlorotrifluoroethylene) (ECTFE), poly(ethylene-co-tetrafluoroethylene) (ETFE), polychlorotrifluoroethylene (PCTFE), poly(tetrafluoroethylene-co-perfluoroalkyl vinyl ether) (PFA or TFA), polyvinylidene fluoride (PVDF), polyvinyl fluoride (PVF), poly(tetrafluoroethylene-co-hexafluoropropylene) (FEP) or poly(tetrafluoroethylene-co-hexafluoropropylene-co-vinylidene fluoride) (TFB), wherein FEP is preferred since it features particularly good processing behavior and high elasticity coupled with a high barrier effect against fuel diffusion.

The mixture used for the extrusion further comprises at least one fluororubber and a crosslinking agent and/or at least one fluororubber elastomer. One, two or more fluororubbers or fluororubber elastomers may be employed.

The mixture generally contains at least one fluororubber and a crosslinking agent for crosslinking the fluororubber. Crosslinking/vulcanization of the fluororubber, generally carried out during formation of the barrier layer, forms a fluororubber elastomer. The crosslinked fluororubber, i.e. the fluororubber elastomer, is therefore present in the barrier layer obtained after extrusion.

The fluororubber may optionally be partially or completely crosslinked even prior to extrusion. In this case the mixture already contains fluororubber elastomer either without or in a mixture with fluororubber and crosslinking agent.

Employable fluororubbers include all customary fluororubbers. Fluororubbers often include vinylidene fluoride (VDF) as a comonomer. Examples of suitable fluororubbers are poly(vinylidene fluoride-co-hexafluoropropylene) (VDF/HFP), poly(vinylidene fluoride-co-hexafluoropropylene-co-tetrafluoroethylene) (TFB), poly(vinylidene fluoride-co-tetrafluoroethylene-co-perfluoromethyl vinyl ether) (VDF/TFE/PMVE), poly(tetrafluoroethylene-co-propylene) (TFE/P) and poly(vinylidene fluoride-co-chlorotrifluoroethylene) (VDF/CTFE). The fluororubber employed in the mixture is preferably a copolymer or terpolymer.

Suitable crosslinking agents for the fluororubber include all crosslinking agents known from the prior art which the person skilled in the art can select as appropriate having regard to the fluororubber used in the desired vulcanization. Conventional crosslinking agents are for example diamines, bisphenols, peroxides, polyols or quaternary ammonium salts.

The proportion of thermoplastic fluoropolymer in the mixture may be for example in the range from 60% to 90% by weight, preferably 70% to 80% by weight. The proportion of fluororubber and/or fluororubber elastomer in the mixture may be for example in the range from 10% to 40% by weight, preferably 20% to 30% by weight. The total amount of thermoplastic fluoropolymer and fluororubber and/or fluororubber elastomer in the mixture may be for example in the range from 80% to 99.8% by weight, preferably 90% to 98% by weight.

Mixtures of thermoplastic fluoropolymers and fluororubbers including crosslinking agents are commercially available as FTPV, for example Dai-EL Fluoro TPV SV-1020, Dai-EL Fluoro TPV SV-1030, Dai-EL Fluoro TPV SV-1032 from Daikin.

In the first and the second embodiment the mixture contains as component c) at least one carbon filler and/or irradiated PTFE.

In the first embodiment the mixture further comprises as component c) at least one carbon filler selected from carbon black, in particular conductivity carbon black, graphene, carbon nanofillers, in particular carbon nanotubes, or a combination thereof, wherein the mixture comprises 0.05% by weight to 20% by weight, preferably 0.2% by weight to 10% by weight, more preferably 0.2% by weight to 9% by weight, of the carbon filler(s). In contrast to elastomers the carbon black content in the mixture should be kept as low as possible.

In a first variant only one or a plurality of carbon black types, in particular conductivity carbon black, is used as the carbon filler. The carbon black is preferably a conductivity carbon black. When the at least one carbon filler is selected from carbon black, in particular conductivity carbon black, the mixture preferably contains 1% to 20% by weight, more preferably 2% to 10% by weight, particularly preferably 3% to 9% by weight, of carbon black, especially conductivity carbon black.

In a second variant the carbon filler selected is graphene, carbon nanofillers, in particular carbon nanotubes, or a combination thereof, wherein carbon nanotubes are preferred. When the at least one carbon filler is selected from graphene, carbon nanofillers, in particular carbon nanotubes, or a combination thereof, wherein carbon nanotubes are preferred, the mixture preferably contains 0.05% to 10% by weight, preferably 0.2% to 5% by weight, of the carbon filler(s).

In a third variant the carbon filler used is a combination of carbon black, in particular conductivity carbon black, and at least one carbon filler selected from graphene, carbon nanofillers, in particular carbon nanotubes, or a combination thereof, wherein a combination of carbon black, in particular conductivity carbon black, and carbon nanotubes is particularly preferred. By addition of graphene or carbon nanofillers, in particular carbon nanotubes, the proportion of carbon black may be significantly reduced, thus achieving better dynamic behavior of the barrier layer.

When the at least one carbon filler is a combination of carbon black, in particular conductivity carbon black, and at least one selected from graphene, carbon nanofillers, in particular carbon nanotubes, or a combination thereof, wherein a combination of carbon black, in particular conductivity carbon black, and carbon nanotubes is particularly preferred, the mixture preferably contains 0.2% by weight to 7% by weight, more preferably 1% by weight to 5% by weight, of the carbon fillers.

In the third variant the weight ratio of carbon black, in particular conductivity carbon black, to the total amount of graphene and carbon nanofillers, in particular carbon nanotubes, (preferably the weight ratio of carbon black, in particular conductivity carbon black, to carbon nanotubes) in the mixture is for example in the range from 7:3 to 3:0.05, preferably 4:3 to 3:0.5.

The carbon black, in particular the conductivity carbon black, preferably has an oil absorption number (OAN) according to ASTM D 2414-16 of more than 140 ml/100 g to 600 ml/100 g, more preferably of 250 ml/100 g to 550 ml/100 g, and/or a specific surface area according to the BET method as per ASTM D6556-04 of 150 to 1400 m$^2$/g, preferably of 600 to 1200 m$^2$/g.

The carbon black is preferably a conductivity carbon black or conductive carbon black. Highly conductive carbon blacks are particularly suitable. These are commercially available, such as for example the conductivity carbon blacks of the series Ketjenblack EC-600 and EC-300J from Akzo-Nobel, Ensaco 250G, 260G and 350G from Imerys, Printex XE2-B, L6, XPB538 from Orion Engineered Carbons, Vulcan XC-72 from Cabot, CL-08 and EH-02 from Continental Carbon India Limited or N472 conductive carbon black from various manufacturers.

Graphenes are formed from two-dimensional layers of covalently bonded carbon atoms which correspond approximately to a single graphite layer. Graphene production processes are for example based on comminution of graphite, for example by mechanical or chemical exfoliation, or on chemical vapor deposition (CVD). The graphenes may be chemically modified. Graphenes have a high electrical conductivity and exceptional mechanical properties.

Examples of carbon nanofillers are, for example, carbon nanofibers (CNF), carbon nanohorns (CNH) and carbon nanotubes (CNT), wherein CNT are particularly preferred.

Carbon nanotubes are in particular carbon tubes having a diameter of about 0.5 to 100 nm. They may have a length many times their diameter. These tubes may be formed from one or more plies of ordered carbon atoms having substantially a graphite or graphene structure. Customary structures of these CNT are cylindrical. The cylindrical structures are distinguished into single-walled and double-walled carbon nanotubes and multi-walled cylindrical CNT. Suitable processes for their production are for example arc discharge, laser ablation, chemical vapor deposition and catalytic chemical vapor deposition. The CNTs may be chemically modified. CNTs are light, have high tensile strength and conduct electrical current. CNT and the synthesis thereof have long been known in the literature and are commercially available.

The at least one carbon filler is preferably selected from carbon black, in particular conductivity carbon black, and/or CNT.

The mixture of the first embodiment may optionally contain irradiated polytetrafluoroethylene (PTFE). Further information about irradiated PTFE is provided hereinbelow in connection with the second embodiment and applies correspondingly to the first embodiment, including in terms of specified amounts and phases.

In connection with the first embodiment it has already been indicated hereinabove that the obtained barrier layer end product preferably contains no thermoplastic elastomer.

In the first embodiment the barrier layer produced according to the invention is preferably no longer meltable.

In the second embodiment the mixture comprises as component c) not a carbon filler according to the first embodiment but rather irradiated polytetrafluoroethylene (PTFE), wherein the mixture preferably contains 1% by weight to 30% by weight, more preferably 1% by weight to 12% by weight, of irradiated PTFE.

Irradiated PTFE is PTFE modified by irradiation, for example by electron or gamma irradiation. Irradiated PTFE contains long-lived radicals, as demonstrable by ESR measurements, which allow chemical bonding of the irradiated PTFE to polymer chains in the mixture, for example during extrusion. The existence of persistent (long-lived) radicals in the irradiated PTFE has long been known. Irradiation may be carried out with an energy dose in the range from 10 to 3000 kGy for example. Irradiation may be carried out with an inert gas. Irradiation in the presence of atmospheric oxygen may cause carboxyl groups to be formed on the polymer chain.

High doses of irradiated PTFE may be added to the mixture without reducing the other properties of the F-TPV. Addition of irradiated PTFE causes the obtained barrier layer to contain in particular at least three polymer phases: For example an FKM elastomer phase, an FKM fluorothermoplastic mixed phase, a fluorothermoplastic phase and a PTFE phase chemically coupled to the matrix.

The mixture according to the first and second embodiments may optionally also form further plastic polymers, such as thermoplastics or rubbers, and/or contain additives customary in this field, for example accelerators which together with the crosslinking agent form a crosslinking system. The proportion of further plastic polymers distinct from those recited hereinabove is preferably less than 10% by weight, more preferably less than 5% by weight.

Further examples of optionally added additives are fillers distinct from the abovementioned carbon fillers and/or processing aids and/or plasticizers and/or aging stabilizers and optionally further additives, for example fibers and color pigments. Processing aids may include especially carnauba waxes, pentaerythrityl tetrastearates, soaps, fatty acid esters, phosphoric acid esters, boric acid esters, acid amides, aliphatic and olefinic waxes and aliphatic and olefinic amines or mixtures thereof.

In a preferred embodiment after extrusion and before vulcanization over the temperature range 140° C. to 300° C. the barrier layer has a value of tan delta <1 calculated with the formula tan delta=G"/G. The storage modulus G' and the loss modulus G" may be measured for example by the method described in the examples.

As mentioned the hose according to the invention comprises at least one barrier layer inner layer and an outer layer. The inner layer having the barrier layer function is the inner layer of the hose which in operation is in contact with the medium to be transported.

In the simplest case the hose is a two-ply hose without an embedded strength member, i.e. formed exclusively from an inner layer and an outer layer. In this connection reference is made to the duplex extrusion process. Normally present, however, is a strength member made of at least one strength member layer which is formed of one or more plies and arranged between the inner layer and the outer layer. In addition to the two-ply main construction and the strength member, further layers, in particular an interlayer, may also be present.

In a preferred embodiment the hose according to the invention has at least one interlayer arranged between the barrier layer/inner layer and the outer layer.

In a further preferred embodiment the hose according to the invention has a strength member arranged between the outer layer and the barrier layer or between the outer layer and the optionally present interlayer.

In terms of the outer layer and the further possible layers the materials customary in the prior art may be used. Preferred variants will now be illustrated and the following abbreviations apply: FKM (fluororubber), ACM (acrylate rubber), AEM (ethylene-acrylate rubber), CM (chlorinated polyethylene rubber), ECO (ethylene oxide-epichlorohydrin rubber), EPM (ethylene-propylene rubber (copolymer)), EPDM (ethylene-propylene-diene rubber (copolymer)), HNBR (hydrogenated acrylonitrile-butadiene rubber), VMQ (silicone rubber).

The outer layer is preferably formed from a crosslinked rubber mixture or an elastomer. The rubber component of the rubber mixture for the outer layer is preferably FKM, ACM, AEM, CM, EPM, ECO, EPDM, HNBR or VMQ or a blend of the aforementioned rubber components, optionally with at least one further rubber component, for example an AEM/EPDM blend. However, unblended rubber mixtures are normally employed. The rubber component of the rubber mixture for the outer layer is particularly preferably ECO, AEM, ACM, CM and/or HNBR. The rubber component of the rubber mixture for the outer layer is very particularly preferably ECO, AEM, ACM, CM or HNBR. If the outer layer is also subjected to great stresses FKM standard mixtures from the prior art may be employed for example. Rubber mixtures based on ACM and/or AEM are preferably crosslinked by diaminic means. Rubber mixtures based on EPM, EPDM and VMQ are preferably crosslinked by peroxidic means.

The intermediate layer, if present, is preferably formed from a vulcanizate of acrylonitrile-butadiene rubber (NBR), a vulcanizate of ethylene oxide-epichlorohydrin rubber (ECO) and/or bisphenol-crosslinked fluororubber (FKM), aminically crosslinked FKM and peroxidically crosslinked FKM, ethylene-acrylate rubber (AEM), acrylate rubber (ACM), chlorinated polyethylene rubber (CM), hydrogenated acrylonitrile-butadiene rubber (HNBR), and combinations thereof. The interlayer may also serve as an adhesive layer between the inner layer and the outer layer and/or the strength member.

The strength member, if present, is especially formed from a woven, formed-loop knit or drawn-loop knit, especially on the basis of a textile material. Suitable materials therefor may be polyamide (PA), polyimide (PI), aramid, in particular para-aramid or meta-aramid, polyvinyl acetal (PVA), polyether ether ketone (PEEK), polyester, especially polyethylene terephthalate (PET) or polyethylene-2,6-naphthalate (PEN), polysulfone (PSU), polyoxadiazole (POD), polyphenylene or polyphenylene derivative, especially polyphenylene sulfide (PPS), or glass fibers. Particular preference is given to p-aramid, m-aramid, polyphenylene sulfide (PPS) and/or polyethylene terephthalate (PET). Hybrid concepts, i.e. hybrids of the above, may also be used, for example in the form of a mixed yarn made of m- and p-aramid or of PPS and PA. As a high-performance material the PPS contributes to high strength while the PA contributes not only via the strength member contribution but also, through its adhesion activatability, to improved adhesion towards the surrounding elastomeric material.

In a preferred embodiment, preferably arranged between the barrier layer and the outer layer, preferably an elastomeric outer layer containing ethylene oxide-epichlorohydrin rubber (ECO), ethylene-acrylate rubber (AEM), acrylate rubber (ACM), chlorinated polyethylene rubber (CM) and/or hydrogenated acrylonitrile-butadiene rubber (HNBR), is at least one elastomeric interlayer, preferably containing ethylene oxide-epichlorohydrin rubber (ECO), ethylene-acrylate rubber (AEM), acrylate rubber (ACM), chlorinated polyethylene rubber (CM) and/or hydrogenated acrylonitrile-butadiene rubber (HNBR), wherein a strength member, preferably containing p-aramid, m-aramid, polyphenylene sulfide (PPS) and/or polyethylene terephthalate (PET), is arranged between the at least one elastomeric interlayer and the outer layer. In other words four layers are present here.

In a further preferred embodiment the hose has five layers. In this embodiment two elastomeric interlayers are arranged between the barrier layer and the outer layer, wherein a strength member is arranged between the two elastomeric interlayers and the outer layer, wherein the barrier layer preferably contains fluorothermoplastic vulcanizates (FTPV), wherein an inner elastomeric interlayer preferably contains fluororubber (FKM), wherein an outer elastomeric interlayer preferably contains ethylene oxide-epichlorohydrin rubber (ECO), wherein the strength member preferably contains m-aramid and wherein the outer layer preferably contains acrylate rubber (ACM).

In a preferred embodiment each elastomeric layer has a resistance of <$10^9$ ohms measured according to DIN IEC 60093:1993-12 and/or
DIN IEC 167 1994-10. In other words each elastomeric layer is electrically conductive.

The hose according to the invention is suitable for example for air-conducting hoses, for example charge air hoses, carbon black particulate filter hoses, control hoses and in particular for fuel hoses, including diesel hoses, or oil hoses, for example turbocharger cooling hoses.

The hose according to the invention exhibits a high fuel, diesel and oil stability.

The invention further relates to a process for producing a hose according to the invention comprising at least one barrier layer inner layer and an outer layer, wherein the process comprises:
1) extruding a mixture comprising
   a) at least one thermoplastic fluoropolymer,
   b) at least one fluororubber and a crosslinking agent and/or at least one fluororubber elastomer and
   c) at least one carbon filler selected from carbon black, in particular conductivity carbon black, graphene, carbon nanofillers, in particular carbon nanotubes, or a combination thereof, and/or irradiated PTFE to form the barrier layer,
2) applying the outer layer and
3) vulcanization of the formed hose construction.

To produce the barrier layer the mixture of the first or second embodiment is extruded, preferably directly into the hose shape provided for the barrier layer.

To form the barrier layer the mixture is preferably extruded at a temperature in the range from 170° C. to 300° C., preferably 240° C. to 270° C.

The vulcanization is preferably carried out at 150° C. to 200° C.

Before extrusion to form the barrier layer the mixture is preferably compounded by premixing the individual components a), b) and c), wherein components a) and b), i.e. thermoplastic fluoropolymer and fluororubber/crosslinking agent and/or fluororubber elastomer, may be employed as a ready-to-use compound, for example in the form of Daikin 1020 or 1030.

Premixing of the components a), b) and c), for example premixing of the components a) and b) with the component c), for example carbon black, in particular conductivity carbon black, may be carried out for example using an extruder, for example a twin-screw extruder. Compounding may be carried out at a temperature in the range from 245° C. to 300° C. for example. The compounded mixture is then obtained as a granulate for example. This is extrudable and may be used for the extrusion to form the barrier layer.

The outer layer may be applied over the inner layer in customary fashion, for example by extruding.

As explained hereinabove an interlayer and/or a strength member may be applied to the barrier layer before application of the outer layer. The interlayer may be extruded onto the barrier layer for example. The strength member may be applied to the barrier layer or the applied intermediate layer in customary fashion.

The invention will now be more particularly elucidated on the basis of an exemplary embodiment with reference to the figures. The figures show:

FIG. 1 an inventive hose which additionally comprises an optional interlayer and an optional strength member.

FIG. 2 Image of a melting test on the inventive barrier layer/inner layer after extrusion and before vulcanization.

FIG. 3 Image of a melting test carried out on a reference.

FIG. 4 results of a dynamic mechanical analysis (DMA) on the inventive barrier layer/inner layer after extrusion and before vulcanization.

FIG. 5 results of the dynamic mechanical analysis (DMA) on a reference.

FIG. 6 results of the dynamic mechanical analyses (DMA) on all samples analyzed.

FIG. 1 shows an inventive hose comprising the following exemplary material concept:

The barrier layer/inner layer 1 was obtained by extrusion of a mixture containing Daikin FTPV SV-1020, a mixture of thermoplastic fluoropolymers and fluororubbers including a crosslinking agent, and 7% by weight, based on the total weight of the mixture, of Ketjenblack EC300J, a carbon black, as the carbon filler, at 260° C. and subsequent vulcanization of the pictured hose assembly at 170° C.

The barrier layer/inner layer 1 is delimited by the interlayer 2. The interlayer 2 is formed by a vulcanizate of ethylene oxide-epichlorohydrin rubber (ECO) and also serves as an adhesion layer between the inner layer 1 and the strength member 3. The strength member 3 is formed from m-aramid and is delimited by the outer layer 4. The outer layer 4 contains acrylate rubber (ACM).

A melting test was performed on the barrier layer/inner layer after extrusion and before vulcanization. The barrier layer/inner layer was not meltable even at 280° C. after extrusion and before vulcanization (FIG. 2). Daikin FTPV SV-1020 pellets without carbon filler served as a reference. This reference was molten at 280° C. (FIG. 3).

A dynamic mechanical analysis (DMA) was carried out on the barrier layer/inner layer after extrusion and before vulcanization. The dynamic mechanical analysis (DMA) was carried out using a Mettler Toledo DMA/SDTA 861. Round specimens were stamped out and installed in the shear specimen holder under prestress. A temperature scan in the range from −140° C. to 300° C. at 10 Hz was selected as the analysis program, maximum force amplitude 10 N, maximum displacement amplitude 2 μm, heating rate 2° C./min.

FIG. 4 shows the analysis profile of the inventive barrier layer/inner layer after extrusion and before vulcanization. The upper section shows the profile of the storage modulus G' and the loss module G" in each case in duplicate. The lower section shows the corresponding profile of tan delta for each of the two specimens. The value for tan delta remains below 1.0 even at temperatures above 220° C.

Figure 1:
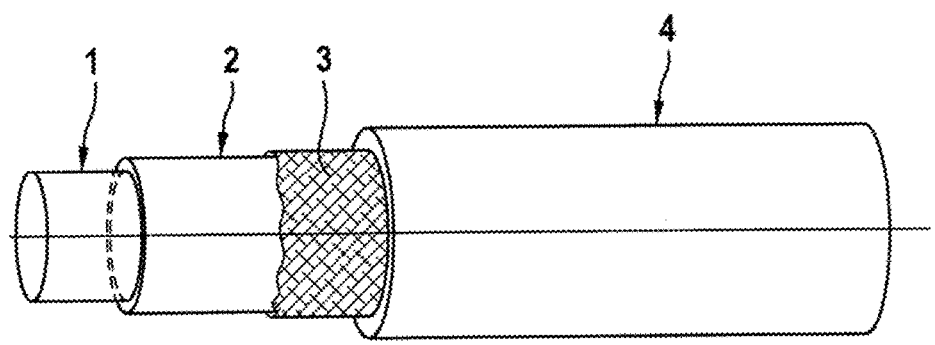
Figure 2:
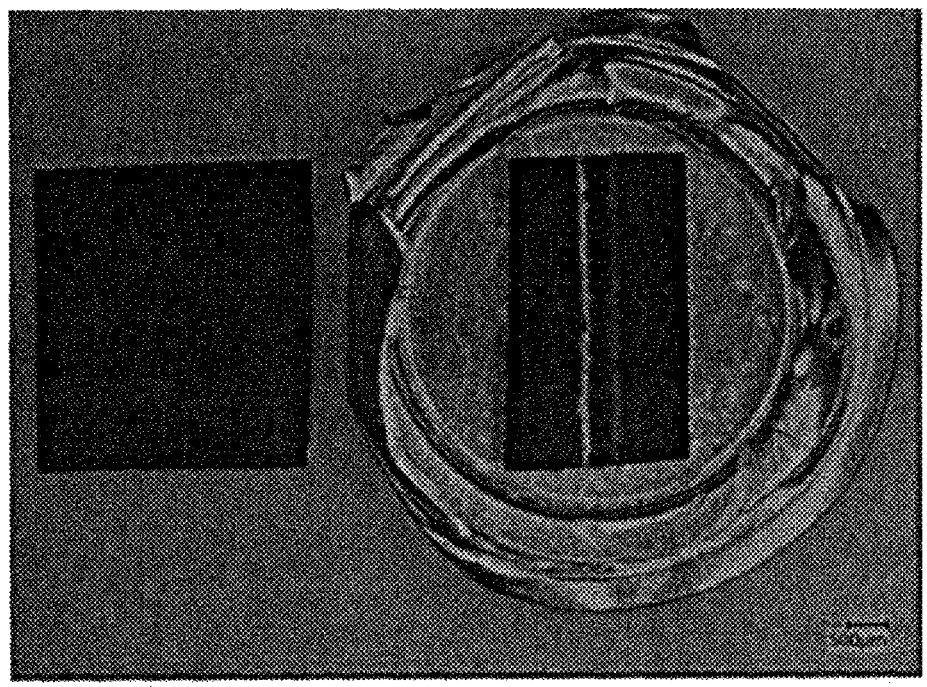
Figure 3:
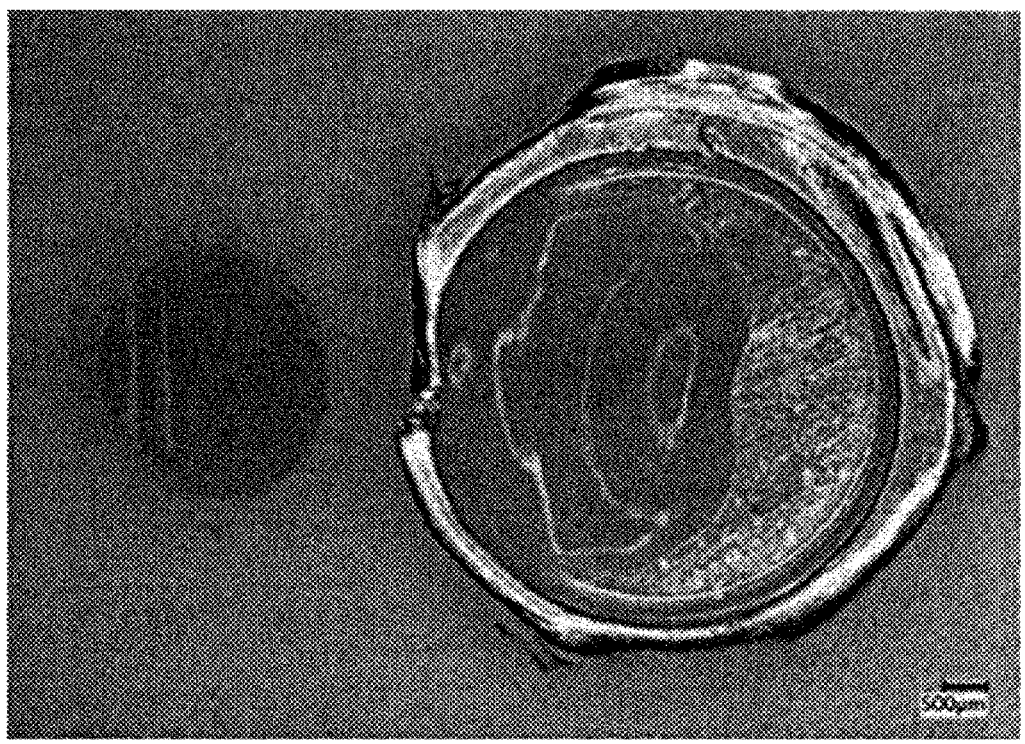
Figure 4:
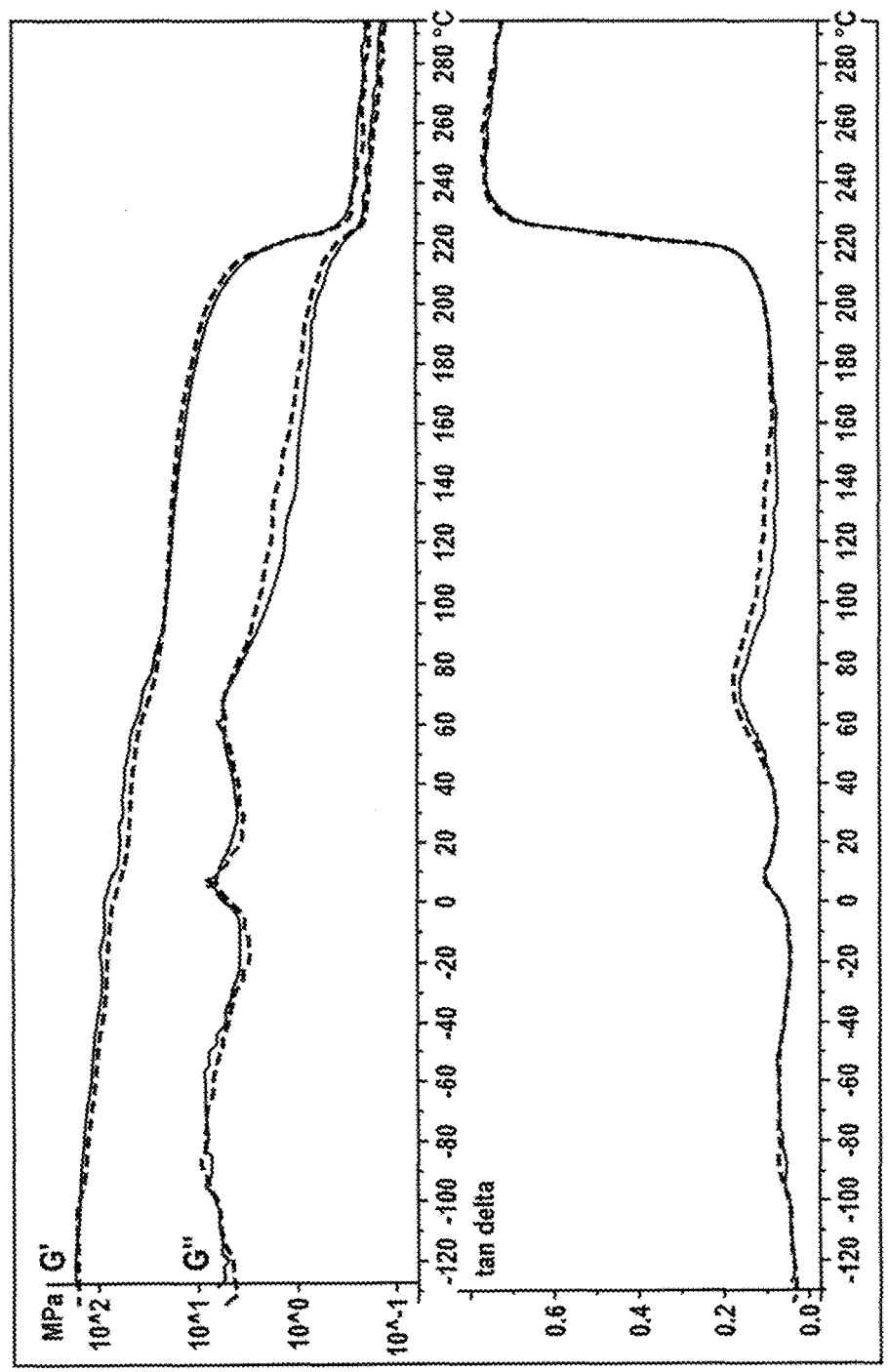
Figure 5:
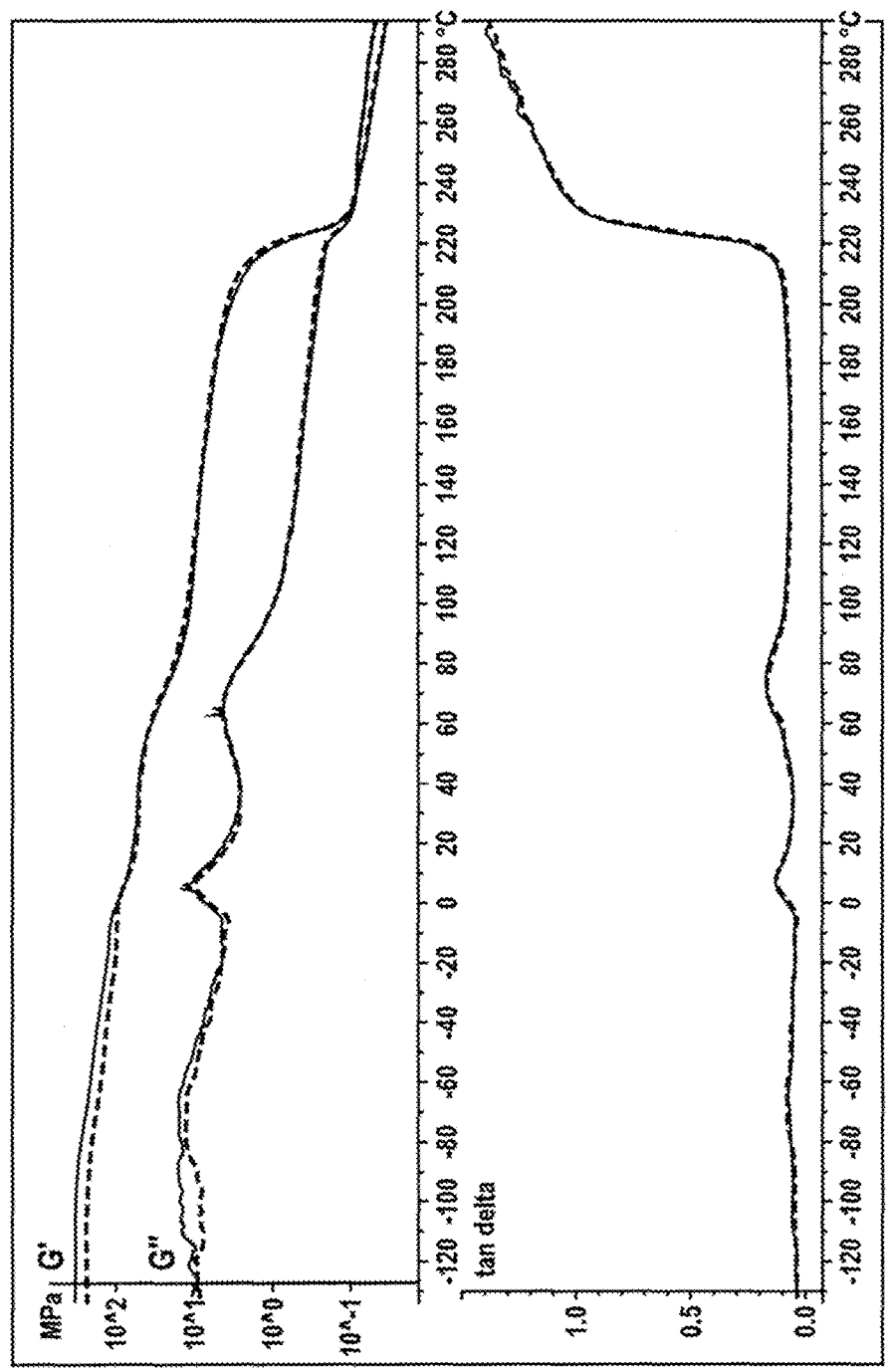
FIG. 5 shows the profile for two corresponding specimens but without carbon filler. A value for tan delta of more than 1.0 is achieved at temperatures above 220° C.
Figure 6:
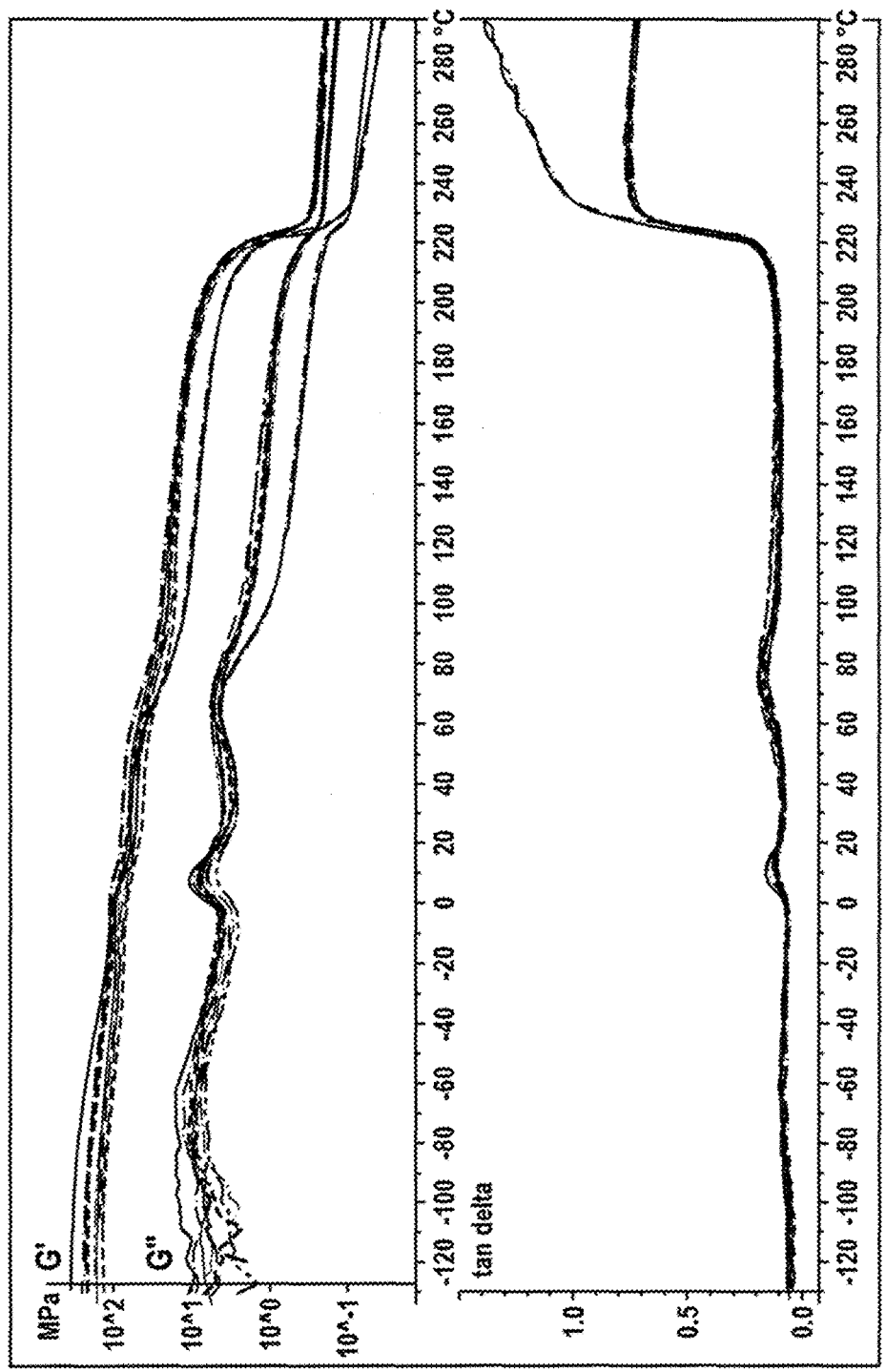
FIG. 6 shows the analysis profiles for various inventive barrier layers/inner layers after extrusion and before vulcanization and also for the noninventive specimens without carbon filler in a graphene.

In contrast to barrier layers produced in corresponding fashion but containing no carbon filler it was surprisingly found in the inventive barrier layers/inner layers after extrusion and before vulcanization that addition of the carbon filler causes the barrier layer to lose its thermoplastic properties. This verifies the dynamic mechanical analysis (DMA). While DMA of a barrier layer produced without the addition of carbon filler results in the typical image for a thermoplastic vulcanizate (TPV), also referred to as a thermoplastic elastomer, melting of the thermoplastic cannot be observed in DMA of the inventive barrier layer produced with carbon filler: The storage modulus G' is not only significantly higher than that of the unfilled reference, but it must also be noted that the storage modulus and loss modulus G" change identically at temperatures above 230° C. This is shown even more clearly by tan delta=G"/G'. At 220° C. the unfilled material shows a tan delta >1 (G">G') while the filled material shows a tan delta of 0.7. According to the literature (for example Wikipedia: https://de.wikipedia.org/wiki/Viskoelastizit%C3%A4t) melting of the reference results in a liquid/melt while the filled material is a solid.

LIST OF REFERENCE NUMERALS

1 Barrier layer/inner layer
2 Intermediate layer
3 Strength member
4 Outer layer

The invention claimed is:

1. A process for producing a hose comprising at least one barrier layer inner layer and an outer layer, wherein the process comprises:
   I) extruding a mixture comprising:
      a) FTPV pellets comprising at least one thermoplastic fluoropolymer, at least one fluororubber and a crosslinking agent; and,
      b) at least one carbon filler selected from carbon black, conductivity carbon black, graphene, carbon nanofiller, or a combination thereof, and/or irradiated PTFE;
   to form the barrier layer;
   II) applying the outer layer over the barrier layer; and,
   III) vulcanizing of the formed hose construction;
wherein the crosslinking agent is selected from the group consisting of diamines, bisphenols, peroxides, polyols and quaternary ammonium salts;
wherein the mixture is extruded at a temperature in the range from 240° C. to 300° C.;
wherein crosslinking of the mixture is carried out during formation of the barrier layer;
wherein the at least one carbon filler promotes the crosslinking; and,
wherein the barrier layer is not meltable at 280° C. after the extruding and before the vulcanizing.

2. The process as claimed in claim 1, wherein the at least one carbon filler is selected from the group consisting of conductivity carbon black, graphene, carbon nanotubes, carbon nanohorns, and any combination thereof.

3. The process as claimed in claim 1, wherein the at least one carbon filler is conductivity carbon black, and the mixture contains 1% to 20% by weight, of the conductivity carbon black.

4. The process as claimed in claim 3, wherein the at least one carbon filler is conductivity carbon black, and the mixture contains 2% to 10% by weight, of the conductivity carbon black.

5. The process as claimed in claim 4, wherein the at least one carbon filler is conductivity carbon black, and the mixture contains 3% to 9% by weight, of the conductivity carbon black.

6. The process as claimed in claim 1, wherein the at least one carbon filler is selected from the group consisting of graphene, carbon nanofillers, and a combination thereof, and the mixture contains from 0.05% to 10% by weight, of the at least one carbon filler.

7. The process as claimed in claim 1, wherein the at least one carbon filler is selected from the group consisting of graphene, carbon nanofillers, and a combination thereof, and the mixture contains from 0.2% to 7% by weight, of the at least one carbon filler.

8. The process as claimed in claim 7, wherein the at least one carbon filler is selected from the group consisting of graphene, carbon nanofillers, and a combination thereof, and the mixture contains from 0.2% to 5% by weight, of the at least one carbon filler.

9. The process as claimed in claim 1, wherein the barrier layer is not meltable.

10. The process as claimed in claim 1, wherein the mixture further comprises irradiated polytetrafluoroethylene (PTFE).

11. The process as claimed in claim 1, wherein at least one interlayer is arranged between the barrier layer and the outer layer.

12. The process as claimed in claim 11, wherein the at least one interlayer comprises at least one member of the group consisting of vulcanizate of acrylonitrile-butadiene rubber (NBR), a vulcanizate of ethylene oxide-epichlorohydrin rubber (ECO) and/or bisphenol-crosslinked fluororubber (FKM), aminically crosslinked FKM and peroxidically crosslinked FKM.

13. The process as claimed in claim 1, wherein the mixture contains 60% by weight to 90% by weight of thermoplastic fluoropolymer and 10% by weight to 40% by weight of fluororubber and/or fluororubber elastomer.

14. The process as claimed in claim 1, wherein arranged between the barrier layer and the outer layer is at least one elastomeric interlayer, comprising ethylene oxide-epichlorohydrin rubber (ECO), ethylene-acrylate rubber (AEM), acrylate rubber (ACM), chlorinated polyethylene rubber (CM) and/or hydrogenated acrylonitrile-butadiene rubber (HNBR);
wherein a strength member comprising p-aramid, m-aramid, polyphenylene sulfide (PPS) and/or polyethylene terephthalate (PET), is arranged between the at least one elastomeric interlayer and the outer layer; and,
wherein the outer layer comprises ethylene oxide-epichlorohydrin rubber (ECO), ethylene-acrylate rubber (AEM), acrylate rubber (ACM), chlorinated polyethylene rubber (CM) and/or hydrogenated acrylonitrile-butadiene rubber (HNBR).

15. The process as claimed in claim 14, wherein the at least one elastomeric interlayer is two elastomeric interlayers, wherein the barrier layer contains fluorothermoplastic vulcanizates (FTPV), wherein an inner elastomeric interlayer contains fluororubber (FKM), wherein an outer elastomeric interlayer contains ethylene oxide-epichlorohydrin rubber (ECO), wherein the strength member contains m-aramid and wherein the outer layer contains acrylate rubber (ACM).

16. The process as claimed in claim 14, wherein the hose is an air-conducting hose, a fuel hose or an oil hose.

17. The process as claimed in claim 1, wherein each layer has a resistance of <109 ohms measured according to DIN IEC 60093:1993-12 and/or DIN IEC 167 1994-10.

18. The process as claimed in claim 1, wherein the mixture is extruded at a temperature in the range from 240° C. to 270° C., wherein the vulcanizing carried out at from 150° C. to 200° C., and wherein the mixture is premixed at a temperature in the range from 245° C. to 300° C. prior to the extruding.

* * * * *